United States Patent [19]
Koike et al.

[11] Patent Number: 5,889,531
[45] Date of Patent: Mar. 30, 1999

[54] GRAPHIC PROCESSING APPARATUS

[75] Inventors: Kazuaki Koike, Nagano; Satoshi Akutagawa, Kawasaki; Yasufumi Ishihara, Tokyo, all of Japan

[73] Assignees: Shinko Electric Industries Co., Ltd., Nagano; Fujitsu Limited, Kanagawa; Japan Nus Co. Ltd., Tokyo, all of Japan

[21] Appl. No.: 826,065

[22] Filed: Mar. 24, 1997

[30] Foreign Application Priority Data

Mar. 29, 1996 [JP] Japan .................................... 8-076957

[51] Int. Cl.$^6$ ..................................... G06F 15/00
[52] U.S. Cl. ............................................. 345/441
[58] Field of Search ................................ 345/441, 442, 345/443, 419, 433, 427

[56] References Cited

U.S. PATENT DOCUMENTS 5,426,729  6/1995  Parker ..................................... 395/155
5,457,775  10/1995  Johnson, Jr. et al. .................. 345/441

OTHER PUBLICATIONS

*Super LSI Integrated Dictionary*, Mar. 31, 1988, first edition, Science Forum K.K. publication office, pp. 144, 145; 440, 441.

*Calculation Geometry*, Sep. 10, 1990, first edition, Asakura Syoten K.K. publication office, Chapter 6.

*Primary Examiner*—Phu K. Nguyen
*Attorney, Agent, or Firm*—Pennie & Edmonds LLP

[57] ABSTRACT

In a program storing unit (14), a dedicated processing program relating to at least one type of specific graphic data in the plurality of types of graphic data and a general purpose processing program which can deal with all of the plurality of types of graphic data are stored. A counting unit (16) counts the number of the specific graphic data included in the graphic data stored in the graphic storing unit. A processing unit (18) compares the counted number of the specific graphic data counted by the counting unit with a predetermined reference value. When the counted value is larger than or equal to the reference value, all of the graphic data are processed by the dedicated processing program, and the graphic data, which cannot be dealt with by the dedicated processing program, are processed by the general purpose processing program. When the count value is less than the reference value, all of the graphic data are processed by the general purpose processing program. Thus, the graphic processing time can be reduced.

4 Claims, 5 Drawing Sheets

GRAPHIC PROCESSING APPARATUS

BACKGROUND OF THE INVENTION

1. Field of the Invention

The present invention relates to a graphic processing apparatus which can perform, at high speed, graphic processing such as decomposing or composing of a plurality of graphic data or checking of whether the graphic data are overlapped, and in more detail, it relates to a graphic processing apparatus having a dedicated processing program for specific graphics which can be processed easily and a general purpose processing program, and when the number of the specific graphics is large, all of the graphic data are first processed by the dedicated processing program, whereby the processing can be performed at a higher speed in comparison with a case where all of the graphics are processed by a general purpose processing program.

2. Description of the Related Art

A conventional graphic processing apparatus will be described. As an example of the conventional apparatus, a graphic processing apparatus used for manufacturing large scale integrated circuits (LSIs) is described. In the graphic processing apparatus for manufacturing LSIs, design data for manufacturing masks are verified or converted into manufacturing data. To do this, the digitized design data (graphic data) for the mask pattern figures are divided into a plurality of rectangles, triangles, parallelograms, and/or trapezoids. Then these plural graphic data are processed.

The above-mentioned conventional graphic processing apparatus comprises a graphic storing unit for storing the plurality of graphic data of a plurality of types (in the above example, four types), a program storing unit for storing a general purpose program which can process all types of the graphic data, and a processing unit for reading the general purpose processing program from the program storing unit to graphically process the graphic data stored in the graphic storing unit.

The processing program is made as a single general purpose processing program which can process all types of figures, in order to minimize the size of the program, to make maintenance easy, and so forth.

The above-mentioned conventional graphic processing apparatus, however, has the following disadvantage.

Namely, the general purpose processing program is made in such a way that it can deal with the most complicated trapezoid graphic data because, if it can deal with the trapezoid graphic data, the other graphic data, such as data of a rectangle, a triangle, or a parallelogram, which can be obtained by specifying some of the parameters of the trapezoid graphic data, can also be dealt with.

That is, when the length of one of the parallel sides of a trapezoid is made to be zero, a triangle can be obtained; when two pairs of the sides are made to be parallel, a parallelogram can be obtained; and when two pairs of the sides are made to be parallel and one interior angle is made to be a right angle, a rectangle can be obtained.

However, since all graphic data are dealt as trapezoid graphic data even when the specified figure is a simple figure such as a triangle or the like, all graphic data have to be processed by the single general purpose processing program, resulting in a disadvantage in that it takes a long time to process the graphics by the processing unit.

SUMMARY OF THE INVENTION

Accordingly, to solve the above-mentioned problem, an object of the present invention is to provide a graphic processing apparatus which can reduce the graphic processing time by making a processing unit able to select a general purpose processing program or a dedicated processing program for processing specified graphics.

To attain the above object, a graphic processing apparatus for graphically processing a plurality of types of graphic data according to a first aspect of the present invention is characterized in that it comprises a graphic storing unit for storing the graphic data, a program storing unit for storing a dedicated processing program relating to at least one type of specific graphic data in the plurality of types of graphic data and a general purpose processing program which can deal with all of the plurality of types of graphic data, a counting unit for counting the number of the specific graphic data included in the graphic data stored in the graphic storing unit, and a processing unit for comparing the counted number of the specific graphic data counted by the counting unit with a predetermined reference value, and for processing, when the counted value is larger than or equal to the reference value, all of the graphic data by the dedicated processing program and, with respect to graphic data which cannot be dealt with by the dedicated processing program, for processing the graphic data by the general purpose processing program, and for processing, when the count value is less than the reference value, all of the graphic data by the general purpose processing program.

A graphic processing apparatus for graphically processing a plurality of types of graphic data according to a second aspect of the present invention is characterized in that it comprises a graphic storing unit for storing the graphic data, a program storing unit for storing a dedicated processing program relating to at least one type of specific graphic data in the plurality of types of graphic data and a general purpose processing program which can deal with all of the plurality of types of graphic data, a counting unit for counting the number of the specific graphic data included in the graphic data stored in the graphic storing unit, a processing time storing unit for storing processing time data necessary to graphically process the specific graphic data by the dedicated processing program, a time calculating unit for determining a processing time of the specific graphic based on a product of the processing time data and the count value of the specific graphic data counted by the counting unit, and a processing unit for comparing the processing time of the specific graphic with a predetermined reference time, and for processing, when the processing time for processing the specific graphic is less than the reference time, all of the graphic data by the dedicated processing program and, with respect to graphic data which cannot be dealt with by the dedicated processing program, for processing the graphic data by the general purpose processing program, and for processing, when the processing time for processing the specific graphic is longer than or equal to the reference time, all of the graphic data by the general purpose processing program.

In practice, the graphic data are digitized graphic data of rectangles, triangles, parallelograms, and trapezoids. The specific graphic data are graphic data of at least one of rectangles, triangles, and/or parallelograms.

A graphic processing apparatus for graphically processing a plurality of types of graphic data according to a third aspect of the present invention is characterized in that it comprises a graphic storing unit for storing the graphic data, a counting unit for counting the number of the graphic data stored in the graphic storing unit, a program storing unit for storing a sort program for rearranging the graphic data in accordance with a predetermined rule and a processing program for graphically processing the graphic data, and a processing unit for comparing the counted number of the graphic data counted by the counting unit with a predetermined reference value, and for rearranging, when the counted value is larger than or equal to the reference value, the graphic data stored in the graphic storing unit by using the sort program, and for processing, when the counted value is less than the reference value, the graphic data stored in the graphic storing unit by using the processing program.

BRIEF DESCRIPTION OF THE DRAWINGS

The above object and features as well as other features of the present invention will be more apparent from the following description of the preferred embodiment with reference to the drawings, wherein.

DESCRIPTION OF THE PREFERRED EMBODIMENTS

First Embodiment

Figure 1:
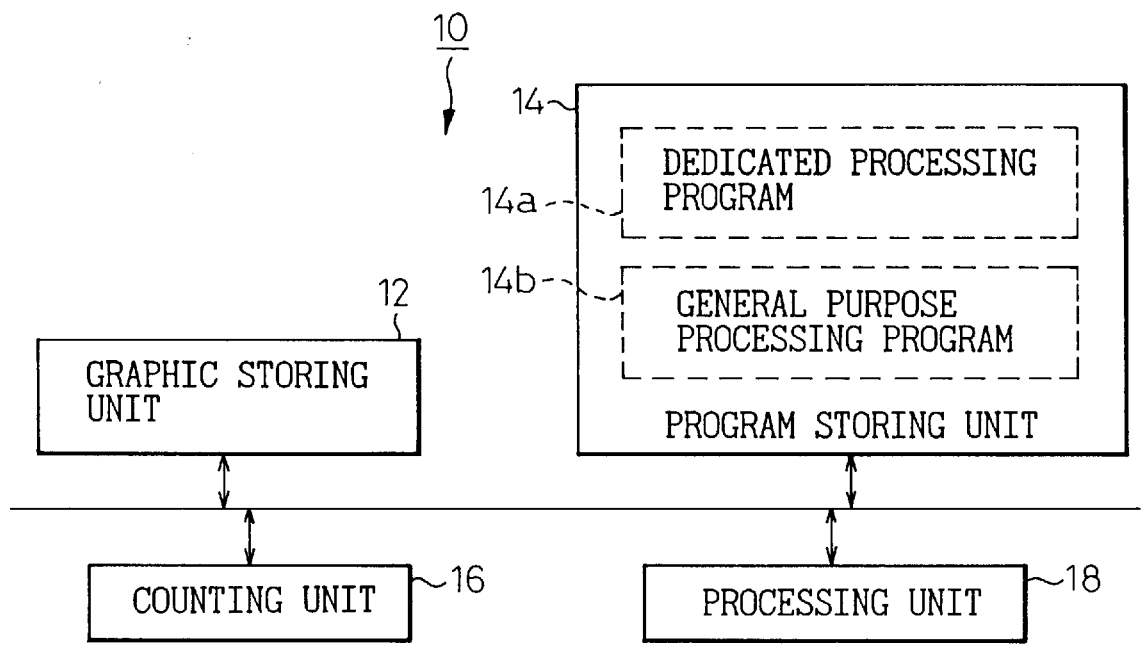
FIG. 1 is a block diagram showing a graphic processing apparatus according to a first embodiment of the present invention.

FIG. 1 is a block diagram showing a graphic processing apparatus according to the present invention. In the figure, a graphic processing apparatus 10 is the one for graphically processing a plurality of types of graphic data. The graphic data is, as an example, design data of a mask formed by overlapping a plurality of submasks or, in other words, CAD layer patterns. Each submask generally include a plurality of polygons. The design data of a mask is used during the manufacturing of LSIs. Accordingly, the main functions of the graphic processing are to combine graphics included in submasks, to check whether graphics are overlapped, and so forth. If a part of a polygon in one submask and a part of a polygon in another submask overlap each other when these submasks are overlapped to form a still another submask or a mask, it is necessary to remove the overlapped part in order to avoid double exposures during the manufacturing of LSIs. To remove the overlapped part, a new polygon having an outer contour of the former polygon and the latter polygon and without an overlapped part is formed in the new submask or mask. The graphic data are those obtained by digitizing mask patterns of respective submasks or a mask, and by dividing them into four types of graphics, i.e., rectangles, triangles, parallelograms, and trapezoids.

Figure 2:
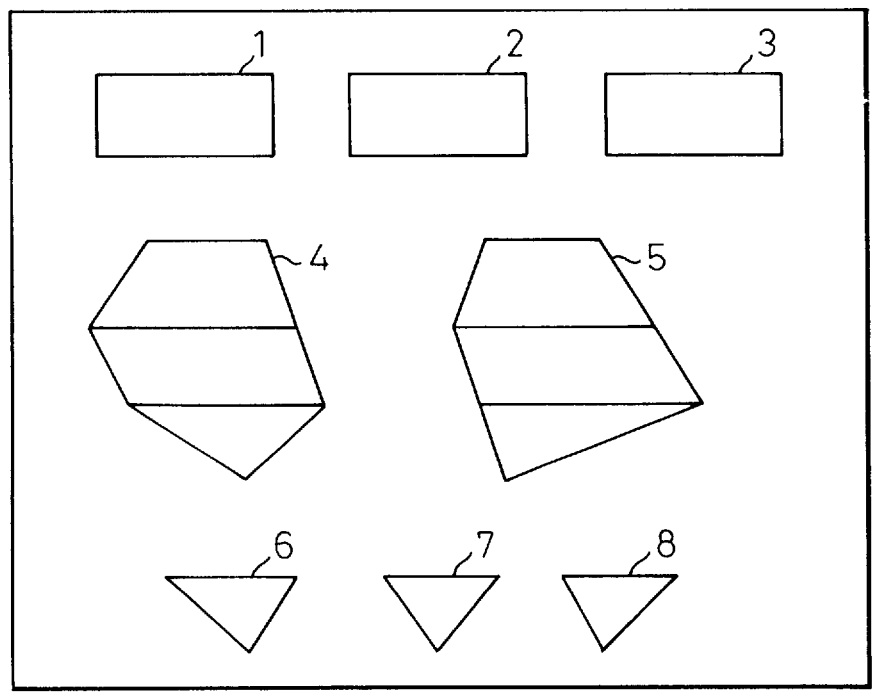
FIG. 2 is a diagram showing a submask including a plurality of polygons.

FIG. 2 shows an example of a submask. As shown in FIG. 2, the submask in this example includes three rectangles 1, 2 and 3, tow polygons 4 and 5, and three triangles 6–7.

Referring back to FIG. 1, reference numeral 12 represents a graphic storing unit for storing a plurality of types of graphic data. The graphic data consists of the above-mentioned four types, i.e., rectangles, triangles, parallelograms, and trapezoids. A submask includes a plurality of graphic data. There are a plurality same as the number of submasks. The number of the submasks stored in the graphic storing unit 12 is plural such as two as an example.

Reference numeral 14 represents a program storing unit for storing a dedicated processing program 14a relating to specific graphic data of at least one type among the three types of graphic except for trapezoids, and a general purpose processing program 14b which can deal with all of the four types of graphic data.

Here the general purpose program 14b is made to be able to deal with the most complex trapezoid graphic data. This is because, when the trapezoid graphic data can be dealt with, the graphic data of the figures obtained by specifying a part of the parameters of the trapezoid graphic such as rectangles, triangles, or parallelograms can also be dealt with. The specific graphic data in this embodiment refers to graphic data of triangles obtained by making either one of a pair of parallel sides of a trapezoid, graphic data of parallelograms obtained by making the two pairs of sides of a trapezoid to be parallel respectively, and/or graphic data of a rectangular obtained by making the two pairs of sides of a trapezoid to be parallel respectively and by making one of the inner angles to be right angle. Further, the specific graphic data may refer to graphic data of squares which can obtain by making the two pairs of sides of a trapezoid to be parallel respectively and by making the four sides to be the same length.

Reference numeral 16 is a counting unit for counting the number of the specific graphic data included in the graphic data stored in the graphic storing unit 12. When there are a plurality of types of the specific graphic data, the number of the specific graphic data is determined for each type.

Reference numeral 18 is a processing unit for controlling the operation of each of the above-mentioned components, and having a function to perform a practical graphic processing.

Figure 3:
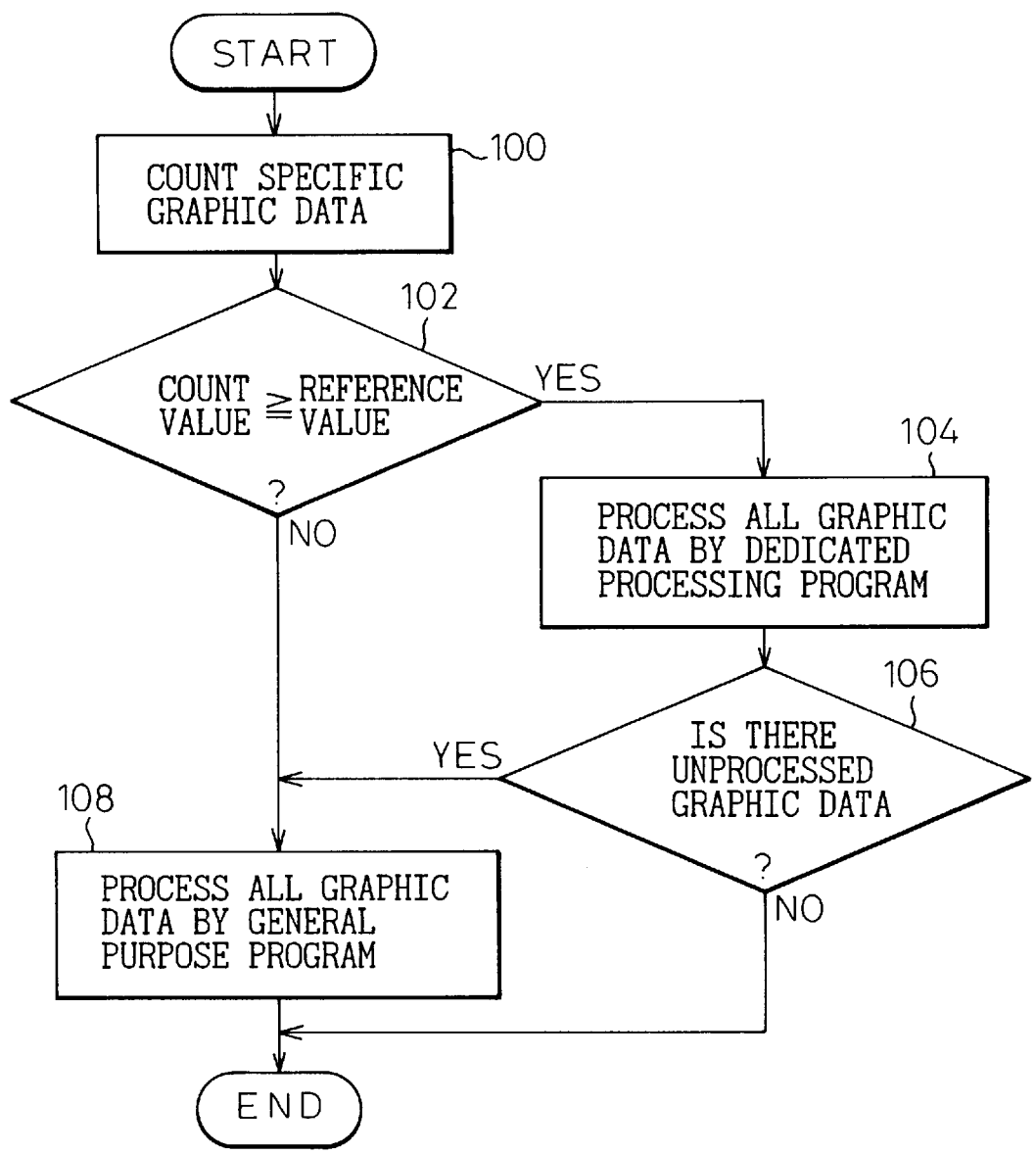
FIG. 3 is a flowchart showing the operation of the apparatus shown in FIG. 1.

Next, the operation of the graphic processing apparatus 10 will be described with reference to FIG. 3.

First, the processing unit 18 controls the counting unit 16 so that it counts the number of the specific graphic data in the graphic data of the two sets of the submasks stored in the graphic storing unit 12 for each type of the specific graphic data (step 100).

Then the processing unit 18 compares the counted value of the specific graphic data counted by the counting unit 16 with a predetermined reference number (step 102).

As a result of the comparison, when the counted value is larger than or equal to the reference value, the processing unit 18 processes all of the graphic data in accordance with the dedicated processing program stored in the program storing unit 14. That is, the processing unit 18 combines the graphic data of the two sets of the submasks, or checks whether there is a duplication (step 104).

When there are a plurality of specific graphic data, and accompanied by this, when there are a plurality of dedicated processing programs, one specific graphic data is processed in accordance with one dedicated processing program, and thereafter, the other specific graphic data are sequentially processed by the dedicated processing programs of the specific graphic data, respectively.

When the graphic processings of the specific graphic data by the dedicated processing programs are finished, it is determined whether or not there is graphic data which has not been processed (step 106). If there is no remaining graphic data which has not been processed, the process proceeds to END so that the graphic processing is finished.

If there remains unprocessed graphic data, or if the count value is less than the reference value at step 102, the process proceeds to step 108 where all graphic data are processed by the general purpose processing program 14b. It should be noted that, at step 102, when the calculated value is less than the reference value, all of the graphic data are processed by the general purpose processing program 14b.

Second Embodiment

Figure 4:
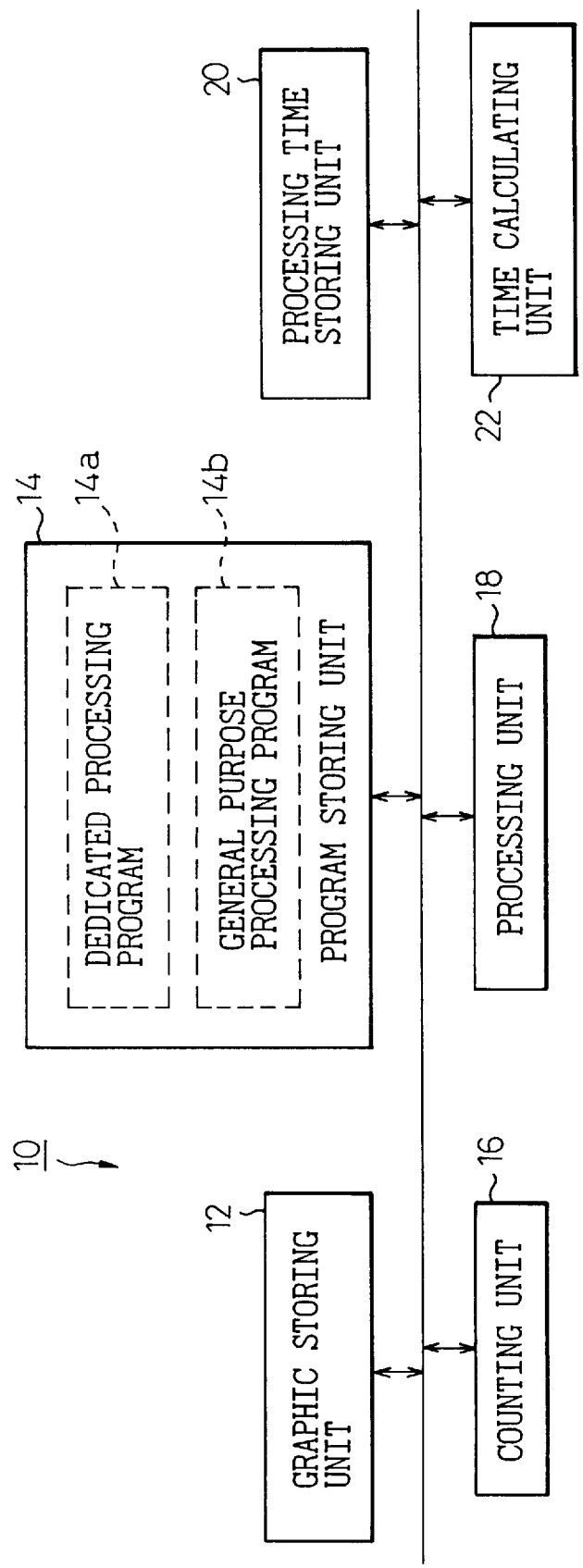
FIG. 4 is a block diagram showing a graphic processing apparatus according to a second embodiment of the present invention.

FIG. 4 is a block diagram of a graphic processing apparatus according to a second embodiment of the present invention. The construction of the graphic processing apparatus according to this second embodiment is almost the same as that in the first embodiment. The same parts as those in FIG. 1 are denoted by the same reference numerals. The difference between the first embodiment and the second embodiment is that the graphic processing apparatus according to the second embodiment further comprises a processing time storing unit 20 for storing processing time data which are times necessary for the dedicated processing programs to process a reference number (for example, one, ten or the like) of the specific graphic data, and a time calculating unit 22 for calculating a specific processing time necessary for each of the specific graphic data to be processed by each of the dedicated processing programs, based on the processing time data and the count value of the specific graphic data counted by the counting unit 16.

Figure 5:
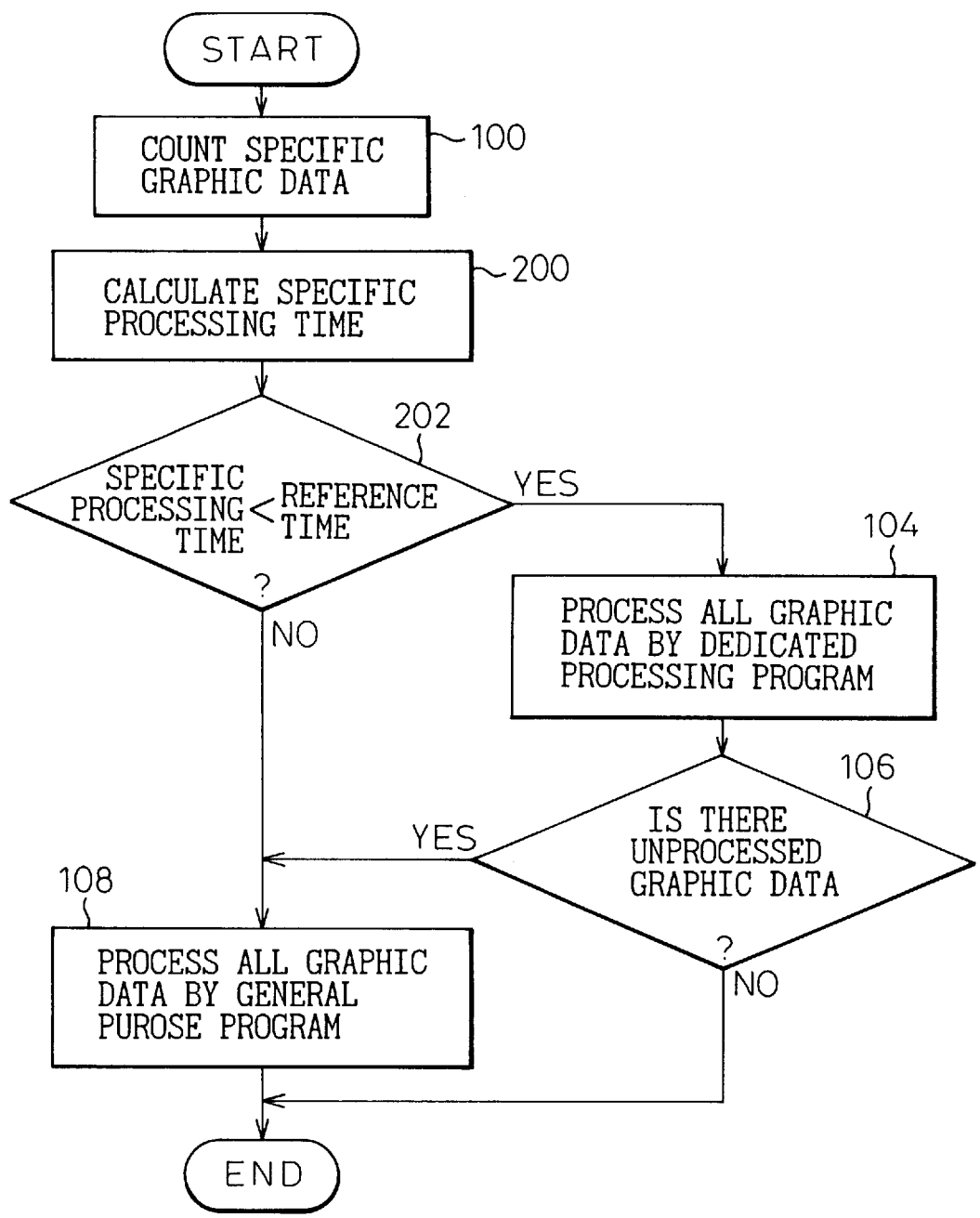
FIG. 5 is a flowchart showing the operation of the apparatus shown in FIG. 3.

FIG. 5 is a flowchart showing the operation of the graphic processing apparatus shown in FIG. 4. The difference between FIG. 3 and FIG. 5 is that the step 102 in FIG. 3 is replaced by steps 200 and 202 in FIG. 5. Namely, the processing unit 18 controls the time calculating unit 22 to determine the specific processing time for each specific graphic data (step 200), compares the determined specific processing time with the predetermined reference time (step 202), judges that, when the specific graphic processing time is less than the reference time, the processing time as a whole will become shorter if the specific graphic data is processed at first, and, based on the judgement, transfers the process to the step 104 where all of the graphic data are processed by the dedicated processing programs 14a. On the contrary, when the specific graphic processing time is longer than or equal to the reference time, the process proceeds to the step 108 where all of the graphic data are processed by the general purpose processing program 14b.

Third Embodiment

Figure 6:
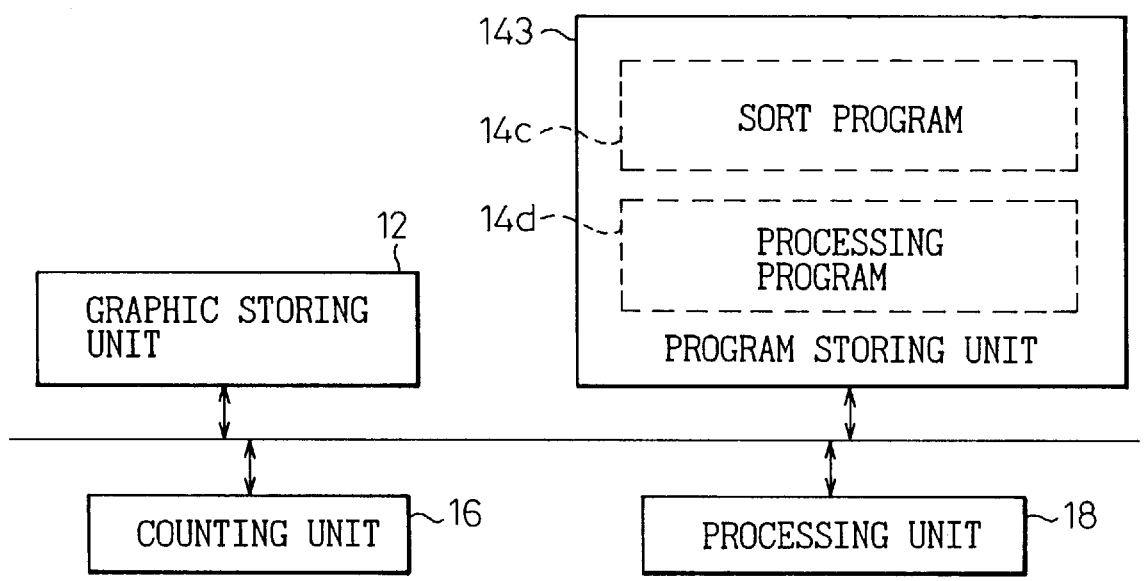
FIG. 6 is a block diagram showing a graphic processing apparatus according to a third embodiment of the present invention.

FIG. 6 is a block diagram showing a graphic processing apparatus according to a third embodiment of the present invention. Again, the same parts as those in FIG. 1 are denoted by the same reference numerals. The main difference between FIG. 1 and FIG. 6 is that, in FIG. 6, a program storing unit 143 stores a sort program 14c for rearranging the graphic data in accordance with a predetermined rule and a processing program 14d for graphically processing the graphic data. The main feature of the graphic processing apparatus shown in FIG. 6 resides in that, taking the number of graphic data into account, a selection is made between an operation flow in which the graphic data are arranged so as to be easily processed, and then the rearranged graphic data are processed, and an operation flow in which the graphic data are processed from the beginning without being rearranged.

Figure 7:
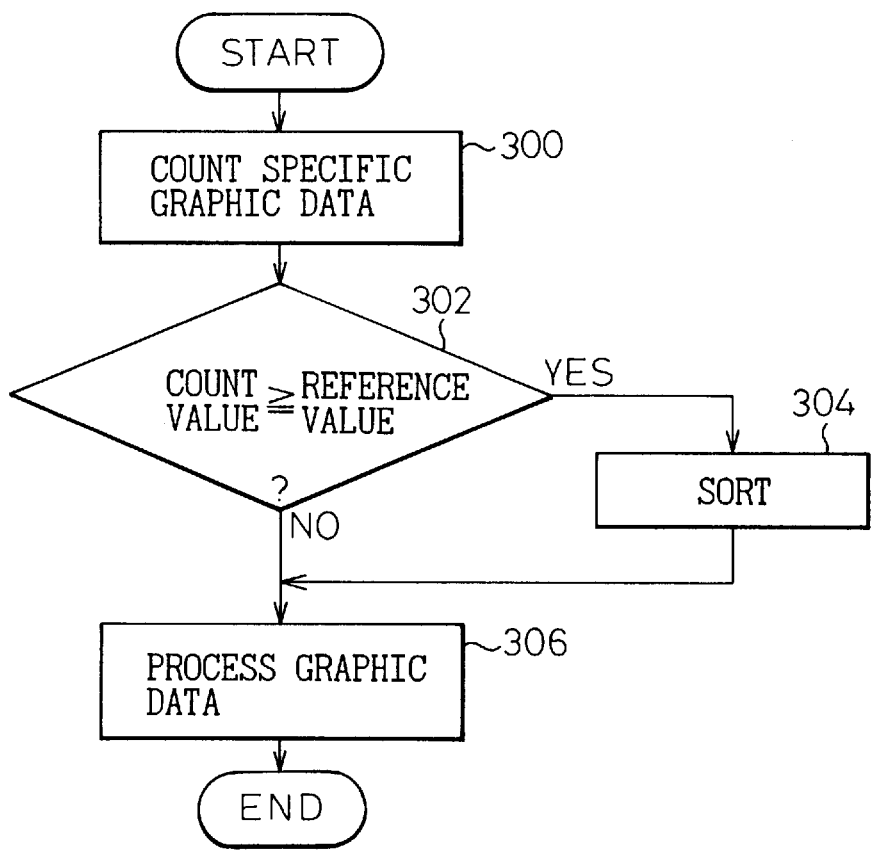
FIG. 7 is a flowchart showing the operation of the apparatus shown in FIG. 5.

FIG. 7 is a flowchart explaining the operation of the apparatus shown in FIG. 6. In operation, the processing unit 18 controls the counting unit 16 to count the number of the graphic data to be processed (step 300).

Then the processing unit 18 compares the counted value counted by the counting unit 16 with a predetermined reference value (step 302). When the counted value is larger than or equal to the reference value, the number of the graphic data to be processed is so large that it can be judged that the graphic processing time as a whole will be shorter if the graphic data are sorted first even though it takes a some time to sort the graphic data. Based on this judgement, the sort program 14c is used to rearrange the graphic data stored in the graphic storing unit 12 (step 304), and then the rearranged graphic data are processed by using the processing program (step 306).

On the contrary, at step 302, when the counted value is less than the reference value, the number of the graphic data is so small that it can be judged that the graphic processing time as a whole will be shorter if the graphic data is processed without being rearranged than the time taken when the graphic data are sorted. Based on this judgement, the graphic data stored in the graphic storing unit 12 are processed by using the processing program 14d without sorting.

The present invention is not restricted to the above-described preferred embodiments, but various modifications are possible without departing the spirit of the present invention.

From the foregoing description, it will be apparent that, by using the graphic processing unit according to the present invention, there are provided a dedicated processing program for processing specific graphic data which can be processed more easily, and a general purpose processing program, and, when the number of the specific graphic data is large, the whole graphic data are first processed by the dedicated processing program, whereby the speed of the graphic processing can be increased in comparison with the case when the whole graphic data are processed only by the general purpose processing program.

I claim:

1. A graphic processing apparatus for graphically processing a plurality of types of graphic data, said graphic processing apparatus comprising:
    a graphic storing unit for storing the graphic data;
    a program storing unit for storing a dedicated processing program relating to at least one type of specific graphic data in said plurality of types of graphic data and a general purpose processing program which can deal with all of said plurality of types of graphic data;
    a counting unit for counting the number of said specific graphic data included in said graphic data stored in said graphic storing unit; and
    a processing unit for comparing the counted number of said specific graphic data counted by said counting unit with a predetermined reference value, for processing, when the counted value is larger than or equal to the reference value, all of the graphic data by the dedicated processing program, for processing the graphic data, which cannot be dealt with by the dedicated processing program, by the general purpose processing program, and for processing, when the counted value is less than the reference value, all of the graphic data by the general purpose processing program.

2. A graphic processing apparatus for graphically processing a plurality of types of graphic data, said graphic processing apparatus comprising:

a graphic storing unit for storing said graphic data;

a program storing unit for storing a dedicated processing program relating to at least one type of specific graphic data in said plurality of types of graphic data and a general purpose processing program which can deal with all of said plurality of types of graphic data;

a counting unit for counting the number of said specific graphic data included in said graphic data stored in said graphic storing unit;

a processing time storing unit for storing processing time data necessary to graphically process said specific graphic data by said dedicated processing program;

a time calculating unit for determining a processing time of the specific graphic based on a product of the processing time data and the count value of said specific graphic data counted by said counting unit; and a processing unit for comparing the processing time of the specific graphic with a predetermined reference time, for processing, when the processing time for processing the specific graphic is less than the reference time, all of the graphic data by the dedicated processing program, for processing the graphic data, which cannot be dealt with by the dedicated processing program, by the general purpose processing program, and for processing, when the processing time for processing the specific graphic is longer than or equal to the reference time, all of the graphic data by the general purpose processing program.

3. A graphic processing apparatus as claimed in claim 1, wherein said graphic data are digitized graphic data of rectangles, triangles, parallelograms, and trapezoids, derived by dividing at least one polygon;

said specific graphic data being graphic data of at least one of the rectangles, triangles, and/or parallelograms.

4. A graphic processing apparatus for graphically processing a plurality of types of graphic data, said graphic processing apparatus comprising:

a graphic storing unit for storing the graphic data;

a counting unit for counting the number of the graphic data stored in said graphic storing unit;

a program storing unit for storing a sort program for rearranging said graphic data in accordance with a predetermined rule and a processing program for graphically processing the graphic data; and a processing unit for comparing the counted number of said graphic data counted by said counting unit with a predetermined reference value, for rearranging, when the counted value is larger than or equal to the reference value, said graphic data stored in said graphic storing unit by using said sort program, and for processing, when the counted value is less than the reference value, the graphic data stored in the graphic storing unit by using the processing program.

* * * * *